US012762102B2

(12) United States Patent
Hoogduin et al.

(10) Patent No.: US 12,762,102 B2
(45) Date of Patent: *Oct. 13, 2026

(54) METHOD FOR ASSURANCE SCORE DETERMINATION ON DATA SETS

(71) Applicant: KPMG Accountants N.V., Amstelveen (NL)

(72) Inventors: Lucas Arnoldus Hoogduin, Amstelveen (NL); Marcel Boersma, Amstelveen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 19/241,026

(22) Filed: Jun. 17, 2025

(65) Prior Publication Data

US 2025/0315419 A1 Oct. 9, 2025

Related U.S. Application Data

(62) Division of application No. 18/737,125, filed on Jun. 7, 2024, now Pat. No. 12,360,972.

(30) Foreign Application Priority Data

Jun. 7, 2023 (NL) ...................................... 2035026

(51) Int. Cl.

*G06F 16/21* (2019.01)
*G06F 16/28* (2019.01)
*G06Q 40/06* (2012.01)

(52) U.S. Cl.

CPC ............ *G06F 16/219* (2019.01); *G06F 16/28* (2019.01); *G06Q 40/06* (2013.01)

(58) Field of Classification Search

CPC ....... G06F 16/219; G06F 16/28; G06Q 40/06; G06Q 10/06395

USPC ............... 707/610, 634, 690, 694, 756, 758, 707/999.001, 17.116

See application file for complete search history.

(56) References Cited

U.S. PATENT DOCUMENTS

| | | | | |
|---|---|---|---|---|
| 7,315,826 | B1 * | 1/2008 | Guheen | G06Q 30/0201 705/7.29 |
| 7,328,202 | B2 * | 2/2008 | Huang | G06F 11/3616 706/2 |
| 12,572,748 | B1 * | 3/2026 | Galvin | G06F 40/30 |
| 2015/0277976 | A1 * | 10/2015 | De | G06F 9/4843 718/101 |
| 2022/0351112 | A1 | 11/2022 | Mochty | |
| 2023/0004888 | A1 | 1/2023 | Li | |
| 2026/0134313 | A1 * | 5/2026 | Bachman | G06N 5/045 |

OTHER PUBLICATIONS

Search report for parent application NL2035026.

* cited by examiner

*Primary Examiner* — Md I Uddin

(74) *Attorney, Agent, or Firm* — Vorys, Sater, Seymour and Pease, LLP; Iona N. Kaiser

(57) ABSTRACT

Methods for determining a value assurance score for an investigated parameter in an application by means of an assurance determination model, in large data sets, in particular in such application contexts as financial record keeping (auditing). The methods are computer-implemented and involves establishing one or more inter-parameter correlations between at least a subset of the potential parameters, where the correlations link at least two of the parameters of the subset.

15 Claims, 3 Drawing Sheets

METHOD FOR ASSURANCE SCORE DETERMINATION ON DATA SETS

FIELD OF THE INVENTION

The present invention is directed to a quality management and reviewing methodology, for amongst others business, financial, clinical, and quality assessment records, and in particular, to a method to perform auditing on these records in order to determine an assurance score or level of certainty of the correctness/accurateness of these records.

BACKGROUND

In the present day, record keeping is growing more voluminous in terms of data, both in terms of historical data (going back longer), as well as vertically (comparison to similar cases), as well as in depth (more accurate and more data points for each feature), making it difficult for reviewers to keep an accurate overview of the entire set or records, and almost impossible to accurately detect all errors over a large set of data.

As such, auditing or reviewing of records in large data sets has in some cases been reduced to sampling, by choosing specific parameters and verifying the values of these parameters in the context of the larger data set. This of course only produces a limited view on the overall correctness of the records, and will often miss mistakes, errors and falsehoods due to the limited size of the samples that can be performed under the applicable time constraints.

A further issue is that for the auditor, the amount of data to consider quickly becomes overwhelming (again, both in number of parameters to take into account, but also the number of data points per parameter), making it necessary to disregard large parts of the data sets. Of course, this has been optimized over the course of time, by specifically choosing which parts to disregard, or even how to aggregate certain parts into 'simpler' or reduced data. However, it still means that the auditor is looking at a simplified or reduced data set, and may miss certain nuances, reducing the accuracy with which the review is performed.

Auditing generally involves comparing a set of requirements against a set of actual data in order to determine whether the data complies with the requirements or how much progress has been made toward a desired objective defined by the requirements. As such, an audit can provide valuable information, so that the auditor may take active steps toward correcting any deficiencies reflected in the data.

Audits can be particularly useful in environments that are requirement-intensive. Company records are one of these contexts, as they are subject to legal contingencies, but also to moral, organisational and other requirements.

Accordingly, there is a need in the art for systems that are flexible enough to provide different types of audit processes and to reuse audit requirements between the different audit types, and very importantly, are suited for taking into account large data sets, with a high number of parameters. In particular, for financial auditing, it is important to take into account national and even international regulations and requirements, as well as the teachings of respected institutes in the field, such as the PCAOB (Public Company Accounting Oversight Board).

SUMMARY OF THE INVENTION

The present invention and embodiments thereof serve to provide a solution to one or more of above-mentioned disadvantages. To this end, the invention relates to a method Computer-implemented method for determining a value assurance score for an investigated parameter in an application by means of an assurance determination model, said method comprising the following steps:

a. providing the assurance determination model, and adapting said assurance determination model to said application, said assurance determination model comprising a predetermined list of potential parameters, the adapting of the assurance determination model comprising:
   i. establishing one or more inter-parameter correlations between at least a subset of the potential parameters, where the correlations link at least two of the parameters of the subset;
   ii. processing historical data sets for a plurality of parameters from the predetermined list of potential parameters, said plurality of parameters comprising the investigated parameter;
   iii. providing the processed historical data sets to said assurance determination model;
   iv. calibrating the established inter-parameter correlations for the parameters for which the processed historical data sets are provided, based on said processed historical data sets;

b. providing a further, preferably contemporary, value for a second plurality of parameters from the predetermined list of potential parameters, said second plurality of parameters comprising the investigated parameter, the second plurality of parameters preferably comprising the same parameters as the plurality of parameters;

c. predicting a projected value for the investigated parameter based on the calibrated inter-parameter correlations of the assurance determination model and the further value or values for the second plurality of parameters;

d. comparing the projected value for the investigated parameter with the further value for said investigated parameter;

e. determining the value assurance score based on the comparison of the projected value with the further value for the investigated parameter, and wherein at least one of the one or more inter-parameter correlations is provided by a non-linear model, and
   wherein predicting the projected value for the investigated parameter uses the non-linear model for the investigated value, and inputs the further values for the parameters in said non-linear model, excepting the further value for the investigated parameter.

DETAILED DESCRIPTION OF THE INVENTION

Figure 1:
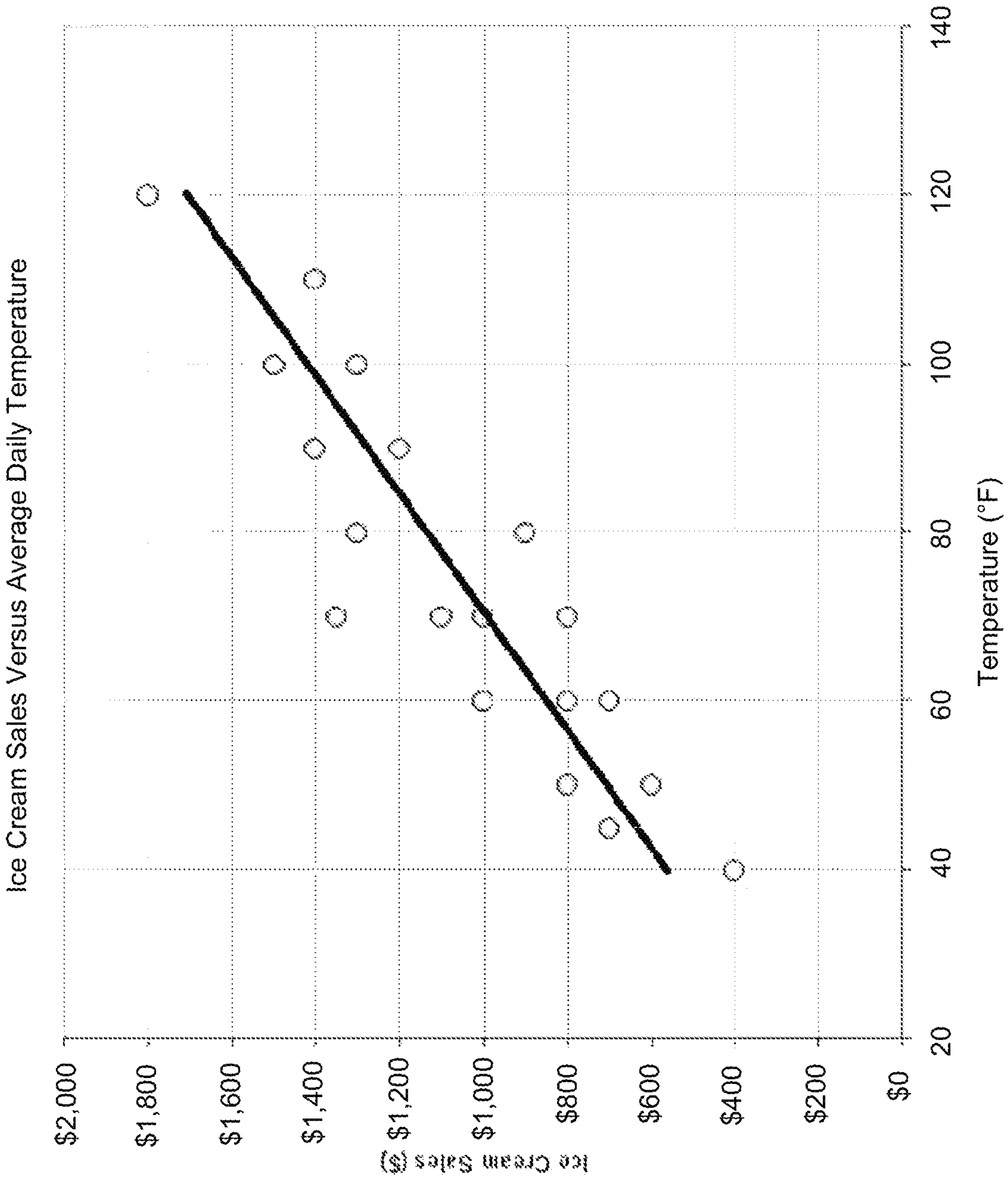
FIG. 1 shows a representative data set with a limited amount of parameters, for which a linear model can be determined via linear regression.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

The recitation of numerical ranges by endpoints includes all numbers and fractions subsumed within that range, as well as the recited endpoints.

The expression "% by weight", "weight percent", "% wt" or "wt %", here and throughout the description unless otherwise defined, refers to the relative weight of the respective component based on the overall weight of the formulation.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. The terms or definitions used herein are provided solely to aid in the understanding of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a computer-implemented method for determining a value assurance score for an investigated parameter in an application by means of an assurance determination model, said method comprising the following steps:

a. providing the assurance determination model, and adapting said assurance determination model to said application, said assurance determination model comprising a predetermined list of potential parameters, the adapting of the assurance determination model comprising:
   i. establishing one or more inter-parameter correlations between at least a subset of the potential parameters, where the correlations link at least two of the parameters of the subset;
   ii. processing historical data sets for a plurality of parameters from the predetermined list of potential parameters, said plurality of parameters comprising the investigated parameter;
   iii. providing the processed historical data sets to said assurance determination model;
   iv. calibrating the established inter-parameter correlations for the parameters for which the processed historical data sets are provided, based on said processed historical data sets;
b. providing a further, preferably contemporary, value for a second plurality of parameters from the predetermined list of potential parameters, said second plurality of parameters comprising the investigated parameter, the second plurality of parameters preferably comprising the same parameters as the plurality of parameters;
c. predicting a projected value for the investigated parameter based on the calibrated inter-parameter correlations of the assurance determination model and the further value or values for the second plurality of parameters;
d. comparing the projected value for the investigated parameter with the further value for said investigated parameter;
e. determining the value assurance score based on the comparison of the projected value with the further value for the investigated parameter, and wherein at least one of the one or more inter-parameter correlations is provided by a non-linear model, and
   wherein predicting the projected value for the investigated parameter uses the non-linear model for the investigated value, and inputs the further values for the parameters in said non-linear model, excepting the further value for the investigated parameter.

Specifically, the methodology is aimed at evaluating the correctness of the value for specific parameters, with respect to the total data set behind it. Typically, the model is preloaded with historical data sets, for instance for past years/months/etc. and/or for other similar cases, for a number of parameters.

In practice, preprocessing can be applied to the received data sets (for instance, linking the parameters of the data sets to 'recognizable' parameters for the methodology, as it is often preprogrammed with fixed names. If the provided data is received with a different nomenclature, this needs to be aligned with what the methodology expects. This preprocessing can be manual, automated or a combination of both.

The model is preloaded with relationships between the parameters, the so-called inter-parameter correlations, which link two or more parameters in each correlation. The exact nature of the correlation can be indicated generally (for instance, linear correlation, exponential, etc.), specifically (more exact formulation of relationship), or can be left undefined at that point, merely indicating that they are linked.

Preferably, the model is preloaded with a large amount of these correlations, such that it is ready to receive any data set without needing to be programmed for the parameters of the new data set. Of course, in some contexts, it is possible that the correlations need to be adjusted, which is possible in the present invention.

The correlations are typically provided to the model based on expert knowledge in the field, and can be the result of experience, academical studies, big data analysis, etc.

Finally, the model uses the historical data sets and the correlations, to map out actual formulas, in the sense of mathematical expressions, to define the relation between the linked parameters for at least a subset, and preferably for each, of the inter-parameter correlations. Specifically, the expressions relating to the investigated parameter(s) are defined.

Starting from these calibrated inter-parameter correlations, the model then processes the further data set that is under investigation, typically a contemporary data set of the last, unvalidated period of time. However, in some cases, this can be an intermediate data set in the past that is under review. This further data set comprises further values for a second plurality of parameters, and specifically the investigated parameter. Based on this further value data set, the model can predict a projected value for the investigated parameter, ignoring the actual further value therefore, by taking into account the calibrated inter-parameter correlations for the investigated parameter, and by inputting the received further values for the parameter(s) in the calibrated inter-parameter correlation(s) for the investigated parameter.

Note that in some cases, the investigated parameter is linked to multiple other parameters in a separate correlation. Preferably, the separate correlations are reconciled with each other in a single correlation that encapsulates each of the separate correlations, whether directly or indirectly. In other cases, it may be preferred to use an average for the projected value, as derived from the multiple separate correlations. The method of determining the average can range from all sorts of statistical averaging options, such as the mean (in its separate possibilities, such as arithmetic, geometric, harmonic, weighted, Lehmer, quadratic, cubic, truncated, interquartile, etc.), median (again, in its variations), mid-range, etc., for the separate values.

However, typically, it is linked via a single correlation, although this can be deconstructed into different correlations. For instance, if A is under investigation, with B, C, D, E and F being other parameters, A can be established as separately correlated to B on the one hand, and C and E on the other hand. However, B in itself can be correlated to C and E, making one of the correlations superfluous usually.

As such, it is advisable that not every known correlation is necessarily used, and that a hierarchy is established, with rules, determining which correlation is preferably used. For instance, for the example above, the methodology can work on the assumption that the correlation between A with C and E is most reliable, so in cases where further data is available for B, C and E, the correlation with C and E is used to predict the projected value for A, while in cases where further data for C and/or E is absent, but present for B, the correlation for A with B is used.

A number of rules can thus be established, indicating which correlations are preferred over others in terms of reliability.

Preferably, the model can be instructed with knowledge on causality, indicating which parameter is to be treated as the independent parameter and which as dependent parameter in each correlation. This avoids circular reasonings and expressions, and can save on computational load when processing data.

The projected value for the investigated parameter is finally compared to the further value for said investigated parameter, providing the reviewer with a clear view on the apparent deviation of the actual further value with respect to what 'logic', experience and data would predict for said value. Based on this deviation, a value assurance score is determined for the investigated parameter, which provides for an objective evaluation for the probability of the further value being correct, not tampered with, not corrupted, accurate, etc. Finally, presented with said assurance score, the auditor can then suggest next steps, for instance a more complete review, or they can simply determine a sufficient level of assurance was obtained, and waive any further investigation.

In some embodiments, the assurance score is further based on user-determinable settings, such as an allowed deviation, either absolute or relative. The allowed deviation may be settable for each parameter separately, or a blanket value that covers each parameter. The former means that certain parameters are considered to be more or less sensitive to deviation, resulting in a higher or lower threshold for the parameter to be reliably valued.

In some embodiments, such features determining assurance score as allowed deviation and others can depend on the reliability of the inter-parameter correlation. Typically, based on the historical data sets, the inter-parameter correlation is determined as a particular model (formula or other). In some cases, the data points of the historical data sets map very accurately onto this model for the correlation, with minimal deviations. In other cases, the mapping is much more variable, with the actual data points differentiating quite strongly from what the fitted model would project. In case of the former, where the historical data sets very accurately correspond to the fitted model, the allowed deviation can be set much lower, as a strongly divergent actual value (in view of the projected value) for parameters under investigation in such a case is much more suspicious than in situations where the data points of the historical data sets also show strong differences with respect to the projected values.

Figure 2A:
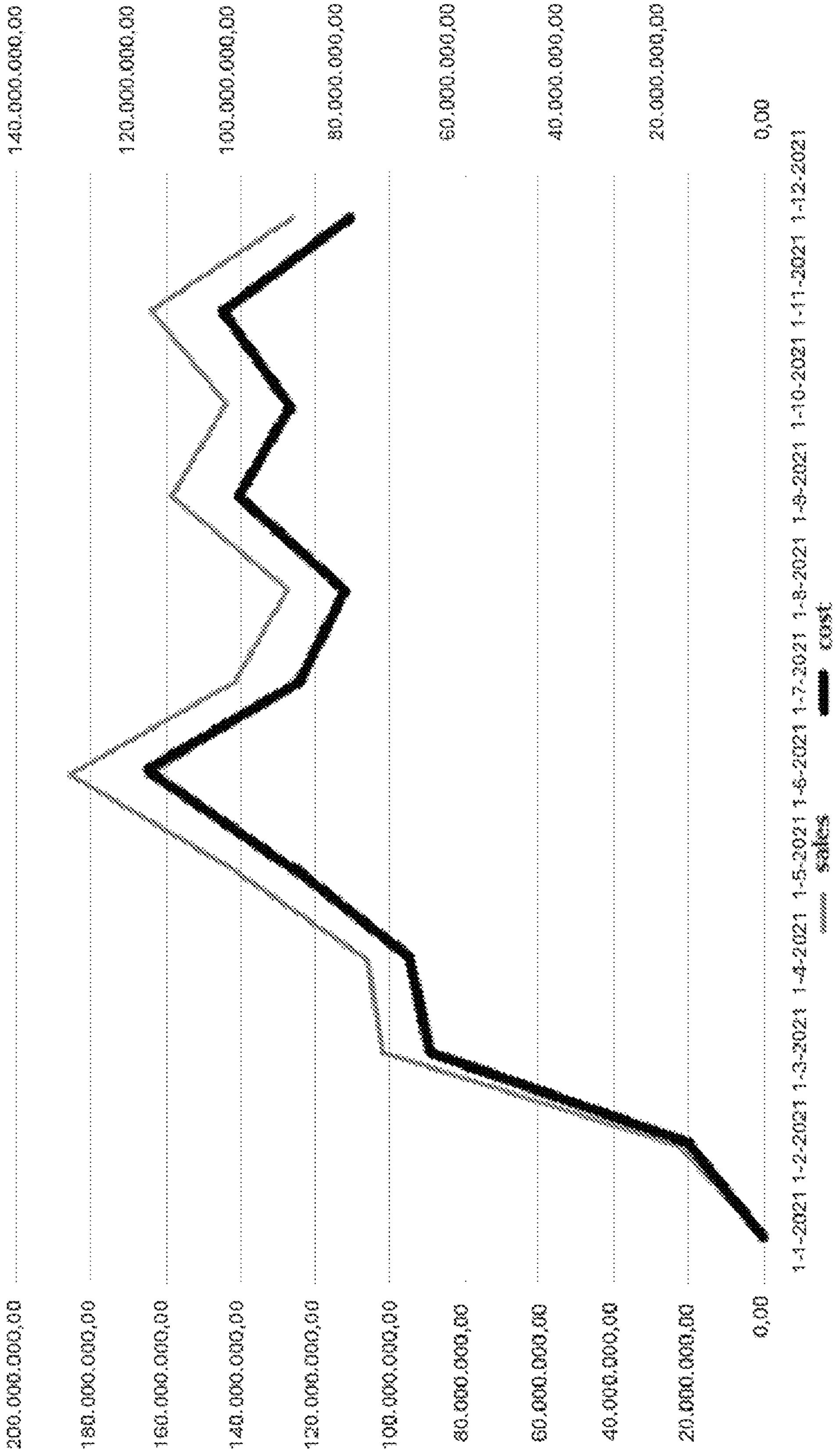
FIG. 2A-B show two data plots (time series in FIG. 2A, scatter plot in FIG. 2B) for a data set, again indicating the possibility to obtain a linear model from the data form the time series plot.
Figure 2B:
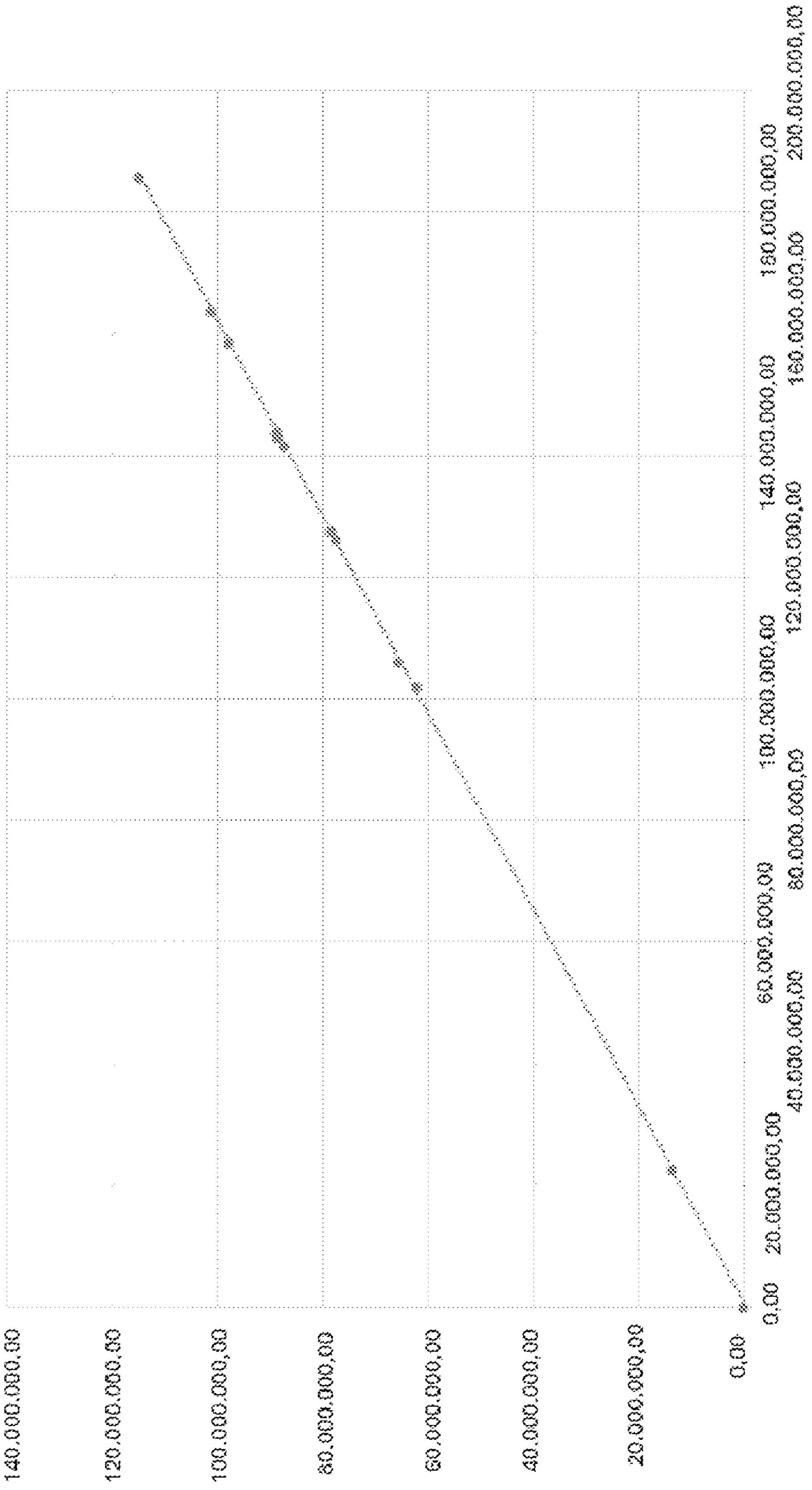

As an example, when looking at FIGS. 1 and 2B, both show linear models that are fitted onto the data points of the historical data sets (for FIG. 1 correlating temperature and sales, for FIG. 2B correlating cost and sales). However, in FIG. 2B, the data points fit almost perfectly onto the linear model, while there is a much stronger deviation in FIG. 1.

When implementing the linear model, and using it to assess the reliability of a value for a parameter under investigation versus the projected value according to the model, the allowed deviation in case of FIG. 1 would be typically set higher than in the case of FIG. 2B.

In a preferred embodiment, the projected value is further processed before comparison to the further value, said further processing comprising at least one of: averaging of the projected value over a plurality of points in time; aggregating the projected value for a plurality of points in time.

In some cases, parameter values at fixed points in time are difficult to deduce directly from data points up to that point, for instance due to a delayed relation, (seasonal) spikes for a parameter at certain points in time, etc. In these cases, it is more important to review the projected value over a prolonged period of time, to balance out these circumstances.

In a preferred embodiment, the processed historical data sets comprise monthly, quarterly and/or yearly data points for the parameter of said historical data set.

In a preferred embodiment, the processed historical data sets comprise cross-sectional data, wherein the processed historical data set comprises grouped data (sub) sets belonging to particular entities (for instance companies A, B, C, . . . ) substantially complete with values for the necessary parameters. Typically, these sets are representative for similar points in time and/or over similar time frames (i.e., at the same time and/or for the same period of time). Based on these grouped data sets, projections can be made for another entity or entities (for instance, company Z). For said other entity, a grouped data set will be available, of which the value(s) are then compared to the projected value(s). In many cases, the entities will be similar to each other in a number of aspects, as this allows a more accurate transfer of the calibrated inter-parameter relationships to the 'unknown' entity under investigation. The aspects mentioned above can be field of industry/services, size, geographical location, etc.

The use of data sets where data points are associated to months, quarters or years, provide structure to the data sets, allowing correlations to be mapped out easily and accurately, and furthermore allowing delayed correlations to be detected and accounted for. For instance, when one detects a higher incoming volume of a material (parameter A) being received at a certain point in time than in the surrounding points in time, which material is then processed into a further product (incoming volume thereof being parameter B), the value for said parameter B will see a similar increase with respect to surrounding points in time, but delayed due to the manufacturing process that takes place on the material.

In short-lived processes or with stable parameters, delays will have little effect, and the delayed effect can be difficult or even impossible to detect, and can be ignored without endangering accuracy. However, in the cases where this effect plays more strongly, such delayed correlations can be decisive to detect discrepancies between the projected and the actual further value for the parameter under investigation.

In a preferred embodiment, at least one, preferably each, of the inter-parameter correlations is provided in the form of a linear model and calibrated by performing a linear regression analysis on the processed historical data sets of the linked parameters of said inter-parameter correlation.

The use of linear regression in the model is preferred due to its simplicity on the one hand, and importantly, the correlations between many parameters in real life, especially in such applications as financial record auditing, can in fact quite aptly be modeled as a linear relation. Using historical data sets, such relations can be easily inferred and accurate approximated. In some cases, the linear regression calibration can even be used to point out discrepancies in the historical data, where values are strongly diverging from a general line. In some embodiments, the model can be determined to exclude such diverging data points from the linear model, and recalibrate the linear model based on the data set without the diverging data points.

In a further preferred embodiment, predicting the projected value for the investigated parameter uses the linear model for the investigated value, and inputs the further values for the parameters in said linear model, excepting the further value for the investigated parameter.

The model makes use of the data sets that comprise the further value that is to be checked for the investigated parameter, but does not use the value for that parameter itself directly or indirectly, in order to avoid contaminating the data on which it bases the projected value. In such cases where values for certain intermediate parameters need to be determined which are not effectively provided, it is dangerous to rely on relationships which could use the value for the parameter under investigation. As such, care should be taken that this value is not used.

In a further preferred embodiment, at least one of the linear models uses the further values for one or more parameters as input. Typically, the linear models will use one or more 'current' parameter values, i.e., values of the same data set in terms of time or context, as the parameter under investigation.

In a further preferred embodiment, at least one of the linear models further uses values from the processed historical data set of one or more parameters as input.

In some cases, values from outside of the data set with the parameter under investigation are used, typically when dealing with delayed effects from certain parameters. This can be for instance income that was received last year but was put in reserve, interest on assets from previous year, etc.

In a further preferred embodiment, each data point in the processed historical data sets is associated to a point in time, and wherein the linear model uses values from mutually different points in time as input.

In a further preferred embodiment, each data point in the processed historical data sets is associated to one or more points in time, and wherein the linear model only uses values from the same point in time as input.

Data points can be related to a particular month (in a specific year), as well as to the specific year, or even further or other distinctions in time (decade, quarter, day, hour, etc.), allowing the model to use the data point in multiple ways.

In many applications and the correlations used therein, it will be of necessary to only use data points that share the exact point in time, as deep as this is distinguished, for some correlations, while for other correlations, data points may be used from a partially shared point in time, typically for the broader point in time (same year, not same month, for instance). This choice may differ between inter-parameter correlations, but may differ between parameters inside the same inter-parameter correlation as well.

In a preferred embodiment, the assurance determination model comprises a predetermined relative deviation threshold for at least the investigated parameter, wherein the deviation of the further value for the investigated parameter with respect to the projected value for the investigated parameter is compared to the predetermined relative deviation threshold, and wherein said comparison is taken into account for determining the value assurance score, preferably wherein the relative deviation threshold determines an acceptable range of values around the projected value for the further value to be situated in.

In a preferred embodiment, the linear model uses values of at least two different parameters as input, excluding the investigated parameter.

In one or more of the correlations, at least three parameters or even four parameters serve as input.

The input parameters for the model can be independent from each other (for instance, the model being determined as $Y=a \cdot A+b \cdot B+\ldots$; with Y the parameter under investigation, A and B the input parameters, a and b being a coefficient). The input parameters can also be used directly combined with each other (for instance, the model being determined as $Y=a \cdot A \cdot B+b \ldots$; with Y the parameter under investigation, A and B the input parameters, a and b being a constant factor).

In a preferred embodiment, at least some of the parameters are linked non-linearly, and wherein the inter-parameter correlations for said non-linearly linked parameters are provided in the form of a linearized model that approximate the non-linear link, preferably via a Taylor approximation.

In some cases, a linear model does not suffice to portray the correlation between certain parameters. In these cases, it can be solved by using a non-linear model (cubic, logarithmic, exponential, etc.), or by approximating the correlation in the form of a linearized model, which can be achieved by a Taylor approximation.

In a preferred embodiment, the uncalibrated inter-parameter correlations link different parameters as an undefined relation, and wherein calibration determines said inter-parameter correlation in a fixed model.

As mentioned before, it was found to be more reliable if only a general relation was provided, without defining the form of the relation (for instance, linear, cubic, "y=ax+b", etc.). This way, the model can be calibrated based on historical data and is not influenced by bias from the person setting up the model.

In a preferred embodiment, the application is an audit procedure on financial data of a company. Financial data records for companies are growing, especially for larger companies. The auditing requirements for these records are also growing more strenuous, making the auditing process itself highly time-consuming, while the volume of data to process makes it highly error-prone, especially as up to now, much depends on the human auditor, who will both need to perform audits on sampled parameter values, as well as reduce the volume of available data to a manageable data set, thus necessarily ignoring large parts of the data. While experience and theoretical studies assist in the segmentation of the data to ensure maximal reliability is maintained, there is an unavoidable loss of reliability. Furthermore, as the auditing process is optimized and standardized more and more, fraudsters may make use of this knowledge and can selectively adjust data that will be kept in the reviewed set, while hiding other adjustments to balance this out in the part of the data set that is typically ignored.

By using the present methodology, full use can be made of the available data, bypassing the (volume) restrictions usually posed by the human auditor, and providing a more reliable assurance score.

In some instances, more complicated techniques are utilized, when linear regression models and even non-linear models would fail, to portray the inter-parameter correlations. This is usually tested by checking the heteroscedasticity of the data (to evaluate the heterogeneity of variance); checking the presence of auto-correlation; checking non-normality of regressions residuals. These features provide a good evaluation if the 'simpler' models will likely fail, and more complex techniques are necessary. These other, more complex techniques can be one more of the following models:

Weighted Least Squares (WLS) model: each observation is given a weight proportional to the inverse of its variance. The weights adjust the contribution of each observation to the regression line and give more weight to observations with smaller variance. WLS assumes that the errors follow a normal distribution with constant variance, and the method is most effective when the variance of the errors is related to a known variable.

Generalized Least Squares (GLS) model: uses weighted least squares to estimate the coefficients of the regression model, with the weights based on an estimated covariance matrix that takes into account both heteroskedasticity and autocorrelation.

Generalized Autoregressive Conditional Heteroskedasticity (GARCH) model: based on time series models and then generalized to accommodate non-constant variance.

Autoregressive Integrated Moving Average (ARIMA) model: univariate time series models that use the past values of a single variable to make predictions about future values. They assume that the future values of a time series are a function of its past values and the error terms. ARIMA models consist of three components: the autoregressive (AR) component, the integrated (I) component, and the moving average (MA) component. The AR component captures the relationship between past values and future values, the I component deals with non-stationary data, and the MA component deals with the error term. ARIMA models are best suited for stationary data and are commonly used for short-term forecasting. Extensions of ARIMA are Seasonal ARIMA or SARIMA models, that incorporate seasonal effects, and exogenous ARIMA or X-ARIMA models, that incorporate values of one or more predictor variables.

Vector Autoregressive (VAR) model: multivariate time series models that use the past values of multiple variables to make predictions about future values. VAR models assume that each variable in the system is a function of its past values and the past values of other variables in the system. VAR models do not require the data to be stationary, and they are useful for modeling the dynamic interrelationships between multiple variables over time. Unlike XARIMA models, VAR models do not explicitly incorporate exogenous variables. Instead, they assume that each variable in the system is influenced by the past values of all the other variables in the system. VAR models are best suited for time series data with multiple variables that may influence each other over time.

Robust regression model: Similar to GLS, Robust regression techniques address issues such as heteroskedasticity and regression outliers in the data, but it is a non-parametric method that does not assume any specific form for the distribution of the errors or the covariance structure. It is based on a robust estimator of the regression coefficients, such as the M-estimator or the S-estimator, that down-weights the influence of outliers in the data. Robust regression is a more flexible method than GLS and can be useful when the data contain influential observations.

Bayesian Structural Time Series (BSTS) model: Bayesian approach to time series analysis that can be used for forecasting, decomposition of time series into components, and causal inference. BSTS models can adjust for heteroskedasticity, autocorrelation, and non-normality of the regression residuals by modeling the errors as a combination of both an autoregressive process and a stochastic volatility process. The autoregressive process models the autocorrelation in the residuals, while the stochastic volatility process models the time-varying variance of the residuals.

Bayesian Neural Networks (BNN) model: BNNs extend neural networks by assigning probability distributions to the network weights and biases. These probability distributions capture the uncertainty associated with the parameters of the model. This allows BNNs to update their belief about the model parameters based on the available data using Bayes' theorem. As more data is observed, the distributions over the parameters get refined, leading to more accurate predictions and better uncertainty estimation. The model employs techniques such as variational inference or Markov chain Monte Carlo (MCMC) sampling to approximate the posterior distribution over the model parameters, enabling it to make predictions by sampling from the posterior distribution and aggregating the results. BNN models are particularly valuable in cases where understanding the model's uncertainty is critical, which is applicable here.

In a further preferred embodiment, the parameters are divided into internal financial data parameters, internal non-financial data parameters, external financial parameters, external non-financial data.

Preferably, the parameters of the model may comprise a subset of the following list, of course depending on the specific context wherein the method is used. As previously mentioned, data will not always be provided for each available parameter.

Potential parameters, especially in financial auditing, can comprise:

Price (product-associated), volume sold/produced/in stock (product-associated), cost (product-associated), salaries, revenues, profit, loss, liquidity, liquid assets, valuation, stock, stock value, equipment and machinery, equipment and machinery value, realty, realty value, intellectual property, intellectual property value, reserve, receivables (over time frames), investments, fixed assets, current assets, depreciation, profit carried forward, debts (over time frames, possibly divided over different creditors), taxes, number of employees (subdivision over categories, such as level of education, legal-social categorization or statute, etc.), data on parent company/subsidiaries, interest rates, currency, exchange rates, banking transactions, CO2 (and/or similar pollutants) emissions, license plate data, certifications, distances traveled (potentially divided over categories of transport), etc.

In a preferred embodiment, the application is an audit procedure on an energy efficiency evaluation procedure for buildings.

Energy evaluation procedures, for instance for obtaining an energy performance certificate (EPC) are also interesting contexts to apply the model, as there is usually both historical data, as well as an enormous volume of comparison data (from other buildings).

In a preferred embodiment, the assurance score as determined for different investigated parameters can be combined in an aggregated assurance score. However, in most cases the assurance scores are considered separate from each other, as a divergent value shouldn't be compensable by other scores that are "acceptable", as this could theoretically allow gaming the system.

Generally speaking, a maximal deviation is preprogrammed. If the projected value differs from the actual value (or vice versa) to an amount exceeding that maximal deviation, further measures are taken.

The further measures can allow for compensation via other procedures, where the extent of the further procedures necessary can again depend on the size of the exceeding deviation.

Alternatively, or in addition, manual review can become necessary, which may or may not compensate for the deviation.

In financial auditing contexts, the auditor has a preset level of assurance that is required for the result to be acceptable. This level can be set by the auditor depending on their own risk estimates, but can be a general level (for instance, legally required, industry standard, etc.). The actual further value for the investigated parameter is compared to the projected value therefor, and results in an obtained level of assurance. If the further value lies in an acceptable difference range (ADR) with respect to the projected value therefor, the obtained level of assurance is compared to the required level of assurance. If the obtained level of assurance is greater than the required level, then the auditor can accept the value, and they can halt the auditing procedure (at least for that parameter). If not, further steps become necessary, such as requesting input from the company to explain the difference, or manual review of sampling of the financial records.

The acceptable difference range (ADR) determines the obtained level of assurance. A narrow ADR, meaning a narrow range in which the projected value is accepted, results in a high level of assurance for it, and the obtained level of assurance will usually be sufficient to pass the required level of assurance check. A wide ADR however means that the obtained level of assurance will be lower, and may not reach the required level of assurance.

The above methodology can be applied to a number of different fields. As mentioned, in finances, a key application of the invention could be in auditing of financial records of a company, stock records (in terms of material in warehouses), and in general most recordkeeping contexts. In complex cases, the size of the data set quickly makes checking the records in a non-sampling fashion (where a few samples are checked rigorously to extrapolate to the rest) de facto impossible for a human, due to time requirements and sheer amount of data to take into consideration.

EXAMPLES

FIG. 1 shows a simple example of linear regression fitted onto a historical data set with data points for temperature (in ° F.) and ice cream sales (in $)—in theory, one could argue time data points are also present, linking the temperature and sales data points. It is assumed that the historical data set is correct and untampered with, and can therefore serve as a basis to assess further data that is investigated. These linked data points of the historical data set (usually linked via shared point in time) already show a clear trend line when plotted out. When performing linear regression analysis on the data points, a reliable correlation between temperature and sales can be seen, which can then be used to assess new data. For instance, the linear model representing the correlation between temperature and sales is determined at Y (sales in $)=$^{85}/_{9}$·X (temperature in ° F.)+265. If for instance the sales need to be checked for the past month, the methodology uses the determined correlation above, fills in the independent value (temperature of said past month), and arrives at the projected value. This value is then compared to the actual value on the books, that is under investigation. If the actual value falls within the range of acceptance of the projected value, the value assurance score will be marked accordingly (depending on the scoring system, this can result in “100%” if within the range, or can be relative, depending on how close it is to the projected value, for instance, (1−(deviation projected versus actual value)/accepted deviation)·100%, or similar formulas.

FIGS. 2A-2B show a second example, where two different visualizations are shown for a data set that shows sales and cost at different points in time.

FIG. 2A shows the time series chart for sales and cost (left axis values for sales, right axis values for cost). The chart of FIG. 2A can provide for an effective visual tool during preprocessing, where the human reviewer can identify ‘problematic’ data points that may be incorrect, corrupted, etc., when show a strongly different trend with the other data points. For instance, in the case of FIG. 2A, this would be the case if an increased sale value at a certain point in time, in view of a previous point in time, is coupled with a reduced cost value at that point in time, again in view of the previous point in time.

It is then up to the reviewer to either flag the anomalous data point(s) as incorrect/corrupted/etc., and indicating that it should be ignored and/or followed up for a more thorough internal check. Alternatively, the deviating data point(s) can indicate that the correlation between the parameters may not be correct in its entirety (usually when multiple data points show poor correlation or strong deviations), which can then lead to the reviewer to remove the inter-parameter correlation for said parameters.

FIG. 2B shows the scatter plot for the sales and cost data sets, with cost on the y-axis and sales on the x-axis. As can be seen, the linear model fitted on the values very accurately maps onto the available data set, confirming that the inter-parameter correlation between the two parameters cost and sales is indeed reliable.

As mentioned, based on these visualizations, preprocessing can take place, such as determining (or confirming) the presence of correlations but also determining which values are unusual (whether by accident or on purpose).

The present invention is in no way limited to the embodiments described in the examples and/or shown in the figures. On the contrary, methods according to the present invention may be realized in many different ways without departing from the scope of the invention.

What is claimed is:

1. Computer-implemented method for determining a value assurance score for an investigated parameter in an application by means of an assurance determination model, said method comprising the following steps:

- a. providing the assurance determination model, and adapting said assurance determination model to said application, said assurance determination model comprising a predetermined list of potential parameters, the adapting of the assurance determination model comprising:
  - i. establishing one or more inter-parameter correlations between at least a subset of the potential parameters, where the correlations link at least two of the parameters of the subset;
  - ii. processing historical data sets for a plurality of parameters from the predetermined list of potential parameters, said plurality of parameters comprising the investigated parameter;
  - iii. providing the processed historical data sets to said assurance determination model;
  - iv. calibrating the established inter-parameter correlations for the parameters for which the processed historical data sets are provided, based on said processed historical data sets;
- b. providing a further value for a second plurality of parameters from the predetermined list of potential parameters, said second plurality of parameters comprising the investigated parameter, the second plurality of parameters comprising the same parameters as the plurality of parameters;
- c. predicting a projected value for the investigated parameter based on the calibrated inter-parameter correlations of the assurance determination model and the further value or values for the second plurality of parameters;
- d. comparing the projected value for the investigated parameter with the further value for said investigated parameter;
- e. determining the value assurance score based on the comparison of the projected value with the further value for the investigated parameter, and wherein at least one of the one or more inter-parameter correlations is provided by a non-linear model, and
  wherein predicting the projected value for the investigated parameter uses the non-linear model for the investigated value, and inputs the further values for the parameters in said non-linear model, excepting the further value for the investigated parameter.

2. Computer-implemented method for determining a value assurance score for an investigated parameter, according to claim 1, wherein the projected value is further processed before comparison to the further value, said further processing comprising at least one of: averaging of the projected value over a plurality of points in time; aggregating the projected value for a plurality of points in time.

3. Computer-implemented method for determining a value assurance score for an investigated parameter, according to claim 1, wherein the processed historical data sets comprise data monthly, quarterly and/or yearly data points for the parameter of said historical data set.

4. Computer-implemented method for determining a value assurance score for an investigated parameter, according to any one of claim 1, wherein at least one, of the inter-parameter correlations is provided in the form of a linear model and calibrated by performing a linear regression analysis on the processed historical data sets of the linked parameters of said inter-parameter correlation.

5. Computer-implemented method for determining a value assurance score for an investigated parameter, according to claim 4, wherein predicting the projected value for the investigated parameter uses the linear model for the investigated value, and inputs the further values for the parameters in said linear model, excepting the further value for the investigated parameter.

6. Computer-implemented method for determining a value assurance score for an investigated parameter, according to claim 4, wherein at least one of the linear models uses the further values for one or more parameters as input.

7. Computer-implemented method for determining a value assurance score for an investigated parameter, according to claim 4, wherein at least one of the linear models further uses values from the processed historical data set of one or more parameters as input.

8. Computer-implemented method for determining a value assurance score for an investigated parameter, according to claim 4, wherein each data point in the processed historical data sets is associated to a point in time, and wherein the linear model uses values from mutually different points in time as input.

9. Computer-implemented method for determining a value assurance score for an investigated parameter, according to claim 4, wherein each data point in the processed historical data sets is associated to one or more points in time, and wherein the linear model only uses values from the same point in time as input.

10. Computer-implemented method for determining a value assurance score for an investigated parameter, according to claim 1, wherein the assurance determination model comprises a predetermined relative deviation threshold for at least the investigated parameter, wherein the deviation of the further value for the investigated parameter with respect to the projected value for the investigated parameter is compared to the predetermined relative deviation threshold, and wherein said comparison is taken into account for determining the value assurance score, wherein the relative deviation threshold determines an acceptable range of values around the projected value for the further value to be situated in.

11. Computer-implemented method for determining a value assurance score for an investigated parameter, according to claim 1, wherein the linear model uses values of at least two different parameters as input, excluding the investigated parameter.

12. Computer-implemented method for determining a value assurance score for an investigated parameter, according to claim 1, wherein at least some of the parameters are linked non-linearly, and wherein the inter-parameter correlations for said non-linearly linked parameters are provided in the form of a linearized model that approximate the non-linear link, via a Taylor approximation.

13. Computer-implemented method for determining a value assurance score for an investigated parameter, according to claim 1, wherein the uncalibrated inter-parameter correlations link different parameters as an undefined relation, and wherein calibration determines said inter-parameter correlation in a fixed model.

14. Computer-implemented method for determining a value assurance score for an investigated parameter, according to claim 1, wherein the application is an audit procedure on financial data of a company.

15. Computer-implemented method for determining a value assurance score for an investigated parameter, according to claim 1, wherein the application is an audit procedure on an energy efficiency evaluation procedure for buildings.

* * * * *